United States Patent
Mowry et al.

(10) Patent No.: US 9,799,278 B2
(45) Date of Patent: *Oct. 24, 2017

(54) DISPLAY SYSTEM AND METHOD

(71) Applicant: GREEN DISPLAY LLC, Southampton, NY (US)

(72) Inventors: Craig P. Mowry, Southampton, NY (US); Jesper K. Thomsen, Espergaerde (DK)

(73) Assignee: GREEN DISPLAY LLC, Southampton, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/159,534

(22) Filed: May 19, 2016

(65) Prior Publication Data
US 2016/0267848 A1    Sep. 15, 2016

Related U.S. Application Data

(63) Continuation of application No. 14/577,765, filed on Dec. 19, 2014, now Pat. No. 9,372,658, which is a
(Continued)

(51) Int. Cl.
*G09G 3/34* (2006.01)
*G06F 3/14* (2006.01)
(Continued)

(52) U.S. Cl.
CPC ........... *G09G 3/344* (2013.01); *G06F 3/1446* (2013.01); *G09F 19/226* (2013.01); *G09G 3/32* (2013.01); *G09G 3/342* (2013.01); *G09G 3/3413* (2013.01); *G09G 2300/026* (2013.01); *G09G 2320/0626* (2013.01); *G09G 2320/0646* (2013.01); *G09G 2320/0666* (2013.01); *G09G 2320/10* (2013.01);
(Continued)

(58) Field of Classification Search
CPC ......... G09G 2330/021; G09G 2360/14; G09G 2320/0626; G09G 2300/026; G09G 2370/16; G09G 2380/06; G09G 2360/144; G09G 3/32
USPC ..... 345/211–213, 204, 690, 105–107, 84–87
See application file for complete search history.

(56) References Cited

U.S. PATENT DOCUMENTS

| | | |
|---|---|---|
| 6,396,985 B2 | 5/2002 | Lowry et al. |
| 8,675,028 B2 | 3/2014 | Mowry et al. |
| 8,947,415 B1 * | 2/2015 | Mowry ................. G06F 3/1446 345/107 |
| 2002/0022499 A1 | 2/2002 | Newman et al. |
| 2002/0126136 A1 * | 9/2002 | Lin ....................... G06F 3/0425 345/619 |
| 2005/0040962 A1 | 2/2005 | Funkhouser et al. |

(Continued)

*Primary Examiner* — Jennifer Nguyen
(74) *Attorney, Agent, or Firm* — Leason Ellis LLP (57) ABSTRACT

A display system includes a plurality of light emitting units configured to float in a fluid medium such that each light emitting unit is movable, each light emitting unit including a light emitting element configured to selectively emit light, a communication element operable to receive instruction data to control operation of the light emitting element; and a power element configured to provide power to at least the light emitting element, and an image capture element configured to receive light emitted by at least one light emitting unit and to generate image data based on the light received and a controller configured to generate the instruction data based at least on a comparison of the image data to a desired image and transmit the instruction data to the communication element to control the light emitting element such that the display system provides the desired image.

16 Claims, 10 Drawing Sheets

Related U.S. Application Data continuation of application No. 13/543,454, filed on Jul. 6, 2012, now Pat. No. 8,947,415.

(60) Provisional application No. 61/504,871, filed on Jul. 6, 2011.

(51) Int. Cl.
*G09G 3/32* (2016.01)
*G09F 19/22* (2006.01)

(52) U.S. Cl.
CPC ... *G09G 2330/02* (2013.01); *G09G 2330/021* (2013.01); *G09G 2360/145* (2013.01); *G09G 2370/16* (2013.01); *G09G 2380/06* (2013.01)

(56) References Cited

U.S. PATENT DOCUMENTS

| | | | |
|---|---|---|---|
| 2006/0158106 A1* | 7/2006 | Morii | H01L 51/0003 313/504 |
| 2007/0242233 A1 | 10/2007 | Sokeila et al. | |
| 2008/0266245 A1 | 10/2008 | Wilcox et al. | |
| 2009/0058760 A1 | 3/2009 | Aoki | |
| 2009/0284128 A1 | 11/2009 | Shinohara et al. | |
| 2010/0056223 A1 | 3/2010 | Choi et al. | |
| 2010/0109987 A1 | 5/2010 | Jessop | |
| 2011/0109607 A1* | 5/2011 | Wu | H01L 31/02167 345/211 |
| 2011/0254877 A1 | 10/2011 | Mowry et al. | |
| 2012/0113624 A1 | 5/2012 | Biring | |
| 2012/0194448 A1 | 8/2012 | Rothkopf | |

\* cited by examiner

DISPLAY SYSTEM AND METHOD

CROSS-REFERENCE TO RELATED APPLICATIONS

The present application is a continuation of Ser. No. 14/577,765, filed Dec. 19, 2014, which is a continuation of Ser. No. 13/543,454, filed Jul. 6, 2012, now U.S. Pat. No. 8,947,415, issued Feb. 3, 2015, which claims benefit of and priority to U.S. Provisional Patent Application Ser. No. 61/504,871 entitled IMPROVED DISPLAY SYSTEM AND METHOD, filed Jul. 6, 2011, the entire contents of each of which is hereby incorporated by reference in its respective entirety.

The present application is related to U.S. application Ser. No. 13/089,949 filed Apr. 19, 2011 entitled DISPLAY SYSTEM AND DEVICE WITH SUSTAINABLE POWER GENERATION which claims benefit of and priority to U.S. Provisional Patent Application Ser. No. 61/342,682 filed Apr. 19, 2010 entitled OLED DISPLAY PANEL SYSTEM, U.S. Provisional Patent Application Ser. No. 61/413,191 filed Nov. 12, 2010 entitled GREEN DISPLAY NETWORK, U.S. Provisional Patent Application Ser. No. 61/420,165 filed Dec. 6, 2010 entitled ENERGY HARVESTING SYSTEM AND FACADES and U.S. Provisional Patent Application Ser. No. 61/453,822 filed Mar. 17, 2011 entitled AN ADDRESSABLE, ENERGY GENERATING DISPLAY SYSTEM, METHOD AND APPARATUS, the entire content of each of which is hereby incorporated by reference herein.

BACKGROUND

Urban areas are typically crowded with buildings and other structures. In view of the large populations in cities, they are a focal point for advertisers and are often crowded with billboards and video displays for presenting advertising information. Indeed, in many cities advertising, information is even provided on taxicabs, buses, phone booths etc.

By necessity, many cities and urban areas have imposed zoning and other regulations to somewhat limit advertising in an attempt to maintain some sense of aesthetic control. As a result, in most cases, the sides of buildings are typically not available for advertising, particularly high-rise type buildings. Further, building owners are likely to limit advertising as well, since advertising would likely obstruct views from the building, and thus, upset tenants.

Further, the large population of cities generally results in enormous energy consumption. Advertising displays on buildings or elsewhere only increases this energy consumption, which is another reason why city officials might limit advertising.

There are certain architectural designs that provide for display and energy generation, typically as parts of buildings, requiring great expense and at least a degree of permanence in the installation of an energy generating "display grid". A benefit of a permanent, constructed grid includes the potential of desirable, hard wired energy generation for use both within the display aspect of the installation/device and/or other energy needs. These other needs may include the building and/or external energy use relative to the structure supporting such a civic energy grid(s). These options, however, must be installed when the building is constructed, and thus, are not applicable to existing buildings. Further, there is little flexibility in these options as they must be incorporated into a specific building and are not usable in other areas.

Accordingly, it would be beneficial to provide a display system and or device that avoids these and other problems.

Co-pending U.S. application Ser. No. 13/089,949 filed Apr. 19, 2011 entitled DISPLAY SYSTEM AND DEVICE WITH SUSTAINABLE POWER GENERATION discusses the background and related art relevant to the present disclosure and is incorporated by reference herein.

SUMMARY

The present disclosure relates to additional embodiments of display systems and methods described in U.S. Pat. No. 8,675,028, issued Mar. 28, 2014 entitled DISPLAY SYSTEM AND DEVICE WITH SUSTAINABLE POWER GENERATION, the entire content of which is incorporated by reference herein.

It is an object of the present disclosure to provide a display system that may be incorporated into a building or other architectural element to illustrate a desired image.

A display system in accordance with an embodiment of the present disclosure includes a plurality of light emitting units configured to float in a fluid medium such that each light emitting unit is movable relative to the other light emitting units, each light emitting unit including a light emitting element configured to selective emit light, a communication element operable to receive instruction data to control operation of the light emitting element; and a power element configured to provide power to at least the light emitting element, and an image capture element configured to receive light emitted by at least one light emitting unit of the plurality of light emitting units and to generate image data based on the light received and a controller configured to generate the instruction data based at least on a comparison of the image data to a desired image and transmit the instruction data to the communication element to control the light emitting element such that the display system provides the desired image.

DETAILED DESCRIPTION OF THE EMBODIMENTS

In certain embodiments, a light emitting element, such as an LED or other comparable lighting component of a display system 10 may be powered by external power components or sources.

In these configurations, a series of wires, or a related matrix of power delivering conduits allow energy from an external battery, grid or other source to be conveyed to the light emitting elements and communication components related to a single or multiple light generating units. This is preferably supported by a flexible substrate, as disclosed.

Figure 1:
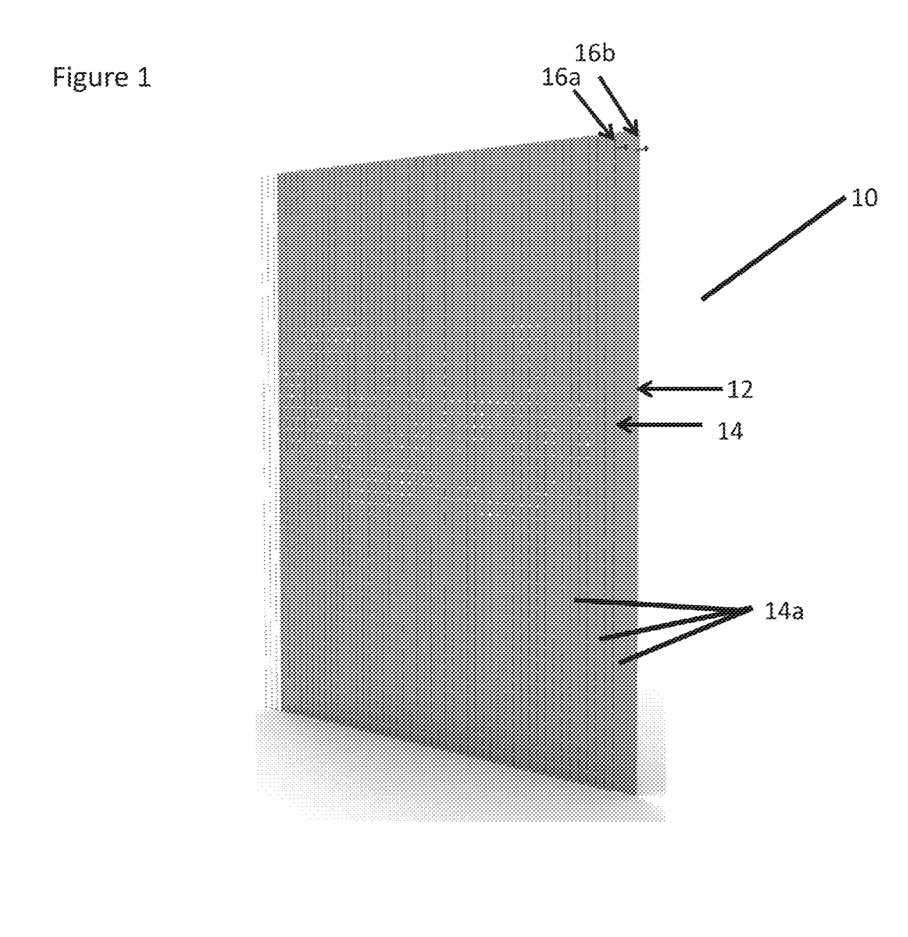
FIG. 1 illustrates an exemplary embodiment of a display system that uses an external power source in accordance with an embodiment of the present disclosure.
Figure 3:
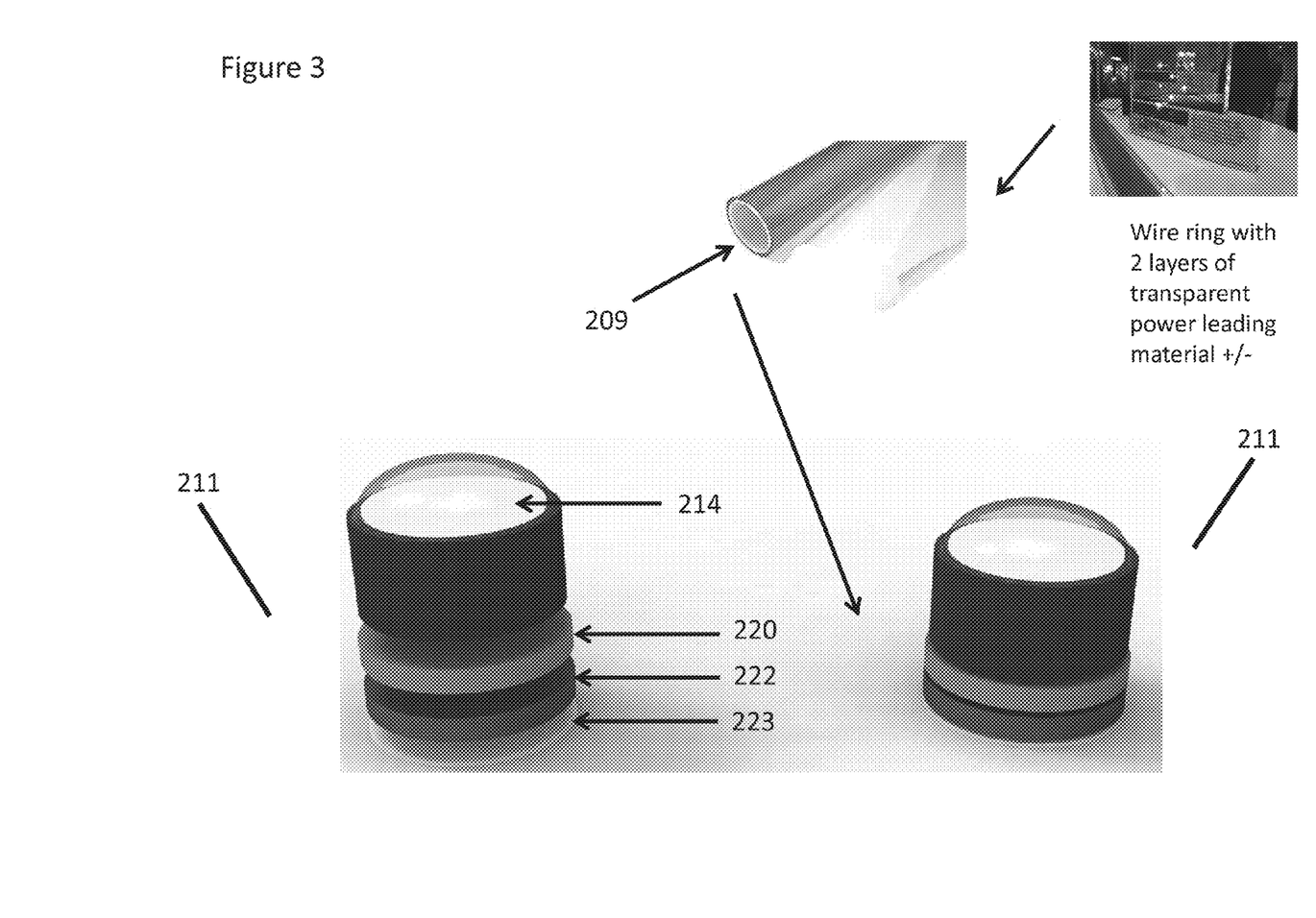
FIG. 3 illustrates an exemplary embodiment of a display system in accordance with an embodiment of the present disclosure.

FIG. 1 for example illustrates a display system 10 in which the light emitting component includes a plurality of light emitting elements 14a, preferably configured as a plurality of light emitting diodes (LEDs) arranged in a flexible drape 14. That is the light emitting elements 14a may be mounted on a flexible substrate, or substrates, in the form of a drape 14. In a preferred embodiment, each light emitting element 14a is preferably associated with a communication element (See element 222, for example of FIG. 3) that receives instruction information related to the illumination of the light emitting element 14 to display a desired image on the system 10. A control element (not shown) may be incorporated into the communication component 220, or separated from the light emitting element 14, if desired. Power is preferably provided via the power terminals 16a, 16b. Conducting paths or conduits may be provided in the substrate of the drape 14 to provide power at least to each light emitting element 14a. A photovoltaic film or other element 12 may be provided to generate power, if desired.

In one example, each distinct portion of substrate, preferably containing at least one light emitting element 14a and selectively at least one linked communication component 220, further includes at least one conduit for conveying energy in and/or out of the substrate, as noted above. Positive and negative powering aspects, that is a positive and ground terminal 16a, 16b, for example, may be provided with two wires formed into a pre-shaped substrate expanse or may be configured to provide energy to at least a minimal portion of substrate with respective components maintained within that substrate, requiring power.

Certain configurations may include the use of distinct, pre-shaped portions of substrate, a square being one example. Like tile, or portions of adhesive wall coverings, such premeasured units may be provided in one or more sizes and shapes. These would adhere, to a surface, for example, by physical adhesive and/or magnetic component functionality and/or through another physically embodied aspect or property of at least the substrate units. In the embodiment of FIG. 1, the pre-shaped aspects may be shaped into the individual elements of the drape 14.

In some configurations, magnetic resonance and related wireless technologies may provide energy to prescribed components maintained within a substrate expanse/portion. An example of this may involve a surface, such as a billboard or wall siding, equipped with wireless magnetic resonance operability comparable to the wireless charging pads used to recharge PDA devices and phones. The substrate, sticker or related component maintaining at least one light emitting element 14a would affix by adhesive, magnetic or other efficient means to maintain position relative to at least a part of the supporting, wireless technology supporting surface. Similarly the drape 14 may be positioned to take advantage of such wireless transfer of power. The system 10 of claim 1 also includes a photovoltaic film 12 that may be used to generate electricity as well.

In an example, a planar and/or irregular surface may provide support for preset squares of substrate, or other selected and/or prepared portions of such component bearing material. This substrate may be light transmissive and/or transparent, or opaque/semi-opaque. Further, the substrate may supplement visual display value with reflective art aspects, selectively, for distinct display of such reflective art and/or in tandem with electronically generating image aspects.

Figure 2:
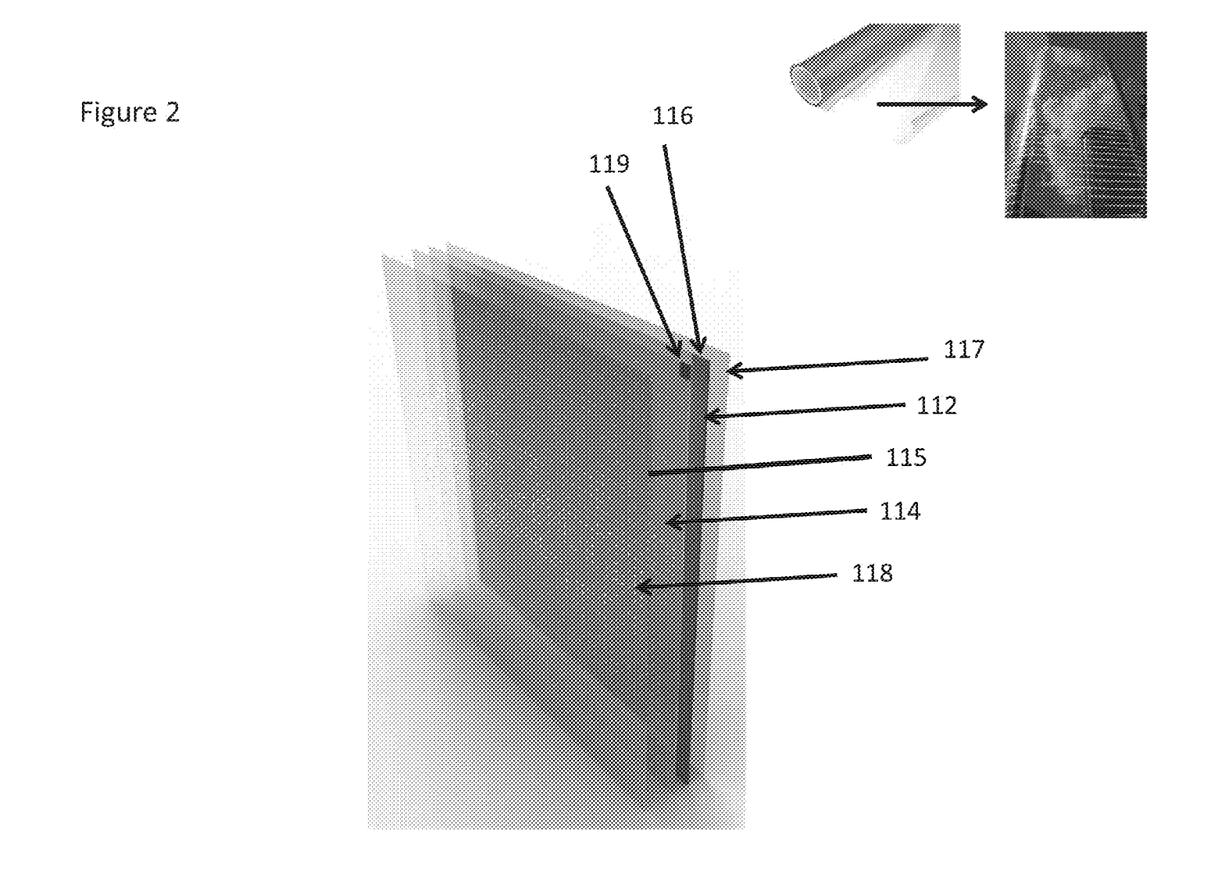
FIG. 2 illustrates an exemplary embodiment of a display system that selectively uses an external power source in accordance with an embodiment of the present disclosure.

FIG. 2 illustrates an embodiment in which the display system 100 is implemented using a planar construction. The system 100 of FIG. 2 allows for self-powering via the photovoltaic sheet 112. Energy may be stored in folio battery 116, either from the sheet 112 or an external source. A data terminal 119 is preferably provided to receive instruction information related to the control of the LED array 114, that is, the light emitting elements. One or more transparent conducting sheet 115 may be provided to transmit power to the LEDs themselves, either from the battery 116 or an external source. All of the components of the system 100 are preferably translucent such that the system 100 may be applied directly to a window, for example, in the side of a building. A privacy film 118 may be included to provide residents of the building with privacy, if desired. An insulating film 117 may also be provided if desired. The system 100 may run directly off of the energy provided by film 112, during the day for example, and then run either off an external supply or stored energy in battery 112 in the evening. The various elements of the system 100 may be embodied in flexible sheets, for example, such that they can be transported in rolls, as illustrated in FIG. 2 and applied to structures such as buildings.

Further, such a supporting surface may provide actual electricity to nodes or portions, if not all, of the surface, in a configuration allowing substrate portions to connect functionally to energy providing portions that make contact with respective portions of energy receiving aspects of each portion of substrate. Then, conveying the energy on to provide functional lighting and/or communications component(s).

Other examples of linked energy generating devices, beyond electricity from a grid, for example, might be a more local system for generating wind based, kinetic, temperature differential based energy, among other energy generating options. These options may provide all, or part of the energy for providing functionality to at least the lighting aspects of the system or device.

In yet another configuration, at least some of the components described relative to a flexible substrate containment, may be provided within a liquid or similarly variable medium. For example, a paint or acrylic like medium to which selectively small lighting emitting elements 14a and/or communication components 222 or power components are added, may incorporate nanotechnology wisely. With such suspended components selectively linked physically and/or wirelessly, to provide operability and addressability, a medium maintained in a fluid or semi-fluid state may provide a floating or otherwise positionally variable display medium. That is the light emitting elements 14a may be suspended in a fluid or semifluid material and applied to a surface or substrate.

Further, should such a fluid medium alter its state to a solid, such as when paint dries, the present configuration would allow for ease of application to interior and exterior surfaces and objects. Further, such surfaces and objects would become electronic display devices following application of the medium, whether self energy generating all or in part, or whether provided with energy from a source external to the components suspected in the medium literally.

Further, such an applied, state-variable medium may allow for components to receive and/or provide light from more than one side of a transparent or semi-transparent supporting surface. For example, a media-supporting pane of glass may allow for solar components to gather light from either or both sides of a pane and transmit electricity to the LED or other light generating component(s) that also may provide illumination to either or both sides of the pane. An example of a substrate involving a variable state media might involve temperature or externally influenced properties of liquid-to-solid variation, such as those influencing paint drying to provide a subsequent, fixed solid configuration of the media.

In yet another configuration, such a medium, which changes state, such as a liquid, which becomes fixed like a solid, more than one "coat" of the medium components may provide additional functionality. For example, a first "coat" of a medium may provide a conductive and/or magnetic and or other energy and/or information conductive property, if not another system relevant function or functions. Further a subsequent coat, or coats, of complementary medium, which may bear all or some of the components, if not already residing in the first laid medium, may interact with at least the first medium coat and its property(s) to provide operability. For example, a first layer, which may or may not begin as a solid, is provided to a surface.

A second applied solid and/or liquid medium is affixed, painted, sprayed or otherwise provided onto the first medium. In tandem, these layers provide enough functionality to provide light generating units, dispersed reasonably, to manifest visuals in tandem. Indeed, the layers may function independently and/or in concert to provide the energy, communications and/or energy generating aspects local to the media, or by way of a functionality to convey externally provided information and/or energy to the components maintained within the one or more media aspects, including overlaid layers of cooperatively functioning media components.

A system configuration and scenario is provided where at least the light generating elements 14a, designed to function in tandem to manifest image information, are not fixed. An image capture device (See element 440 of FIG. 9, for example), or devices, alone and/or with at least one signal positioning correlating device, or controller (See element 450 of FIG. 9, for example), may update the location of the light emitting elements 14a relative to image information with selective frequency. Indeed, high speed digital imaging capture devices may provide fast enough image updates relative to the desired image result, to provide instructions to each light emitting element 14a to provide an aesthetically acceptable result at least relative to the maximum speed within which the light generating units are moving relative to each other.

In an embodiment, a display system 200 (See FIG. 3) may be provided using distinct lighting units 211 that are mounted on a conducting substrate or film 209. In a preferred embodiment, two separate layers of film 209 are used to provide for both a power supply and a return, or ground. The film 209 may be indium tin oxide or any other suitable flexible conducting material. Each lighting unit 211 includes a light emitting element 214 configured to selectively emit light. A battery 220 or other power storage or generating element may be provided. Power may be provided to the battery 220 and stored via the conducting film 209. Alternatively power may be provided directly to the light emitting element 214. A communication element 222, which may be a Wi-Fi element, for example, may be provided to receive instruction information for controlling illumination of light emitting element 214 to provide a desired image. The unit 211 may be secured to the film 209 via an adhesive, which may be conductive or non-conductive.

Figure 9:
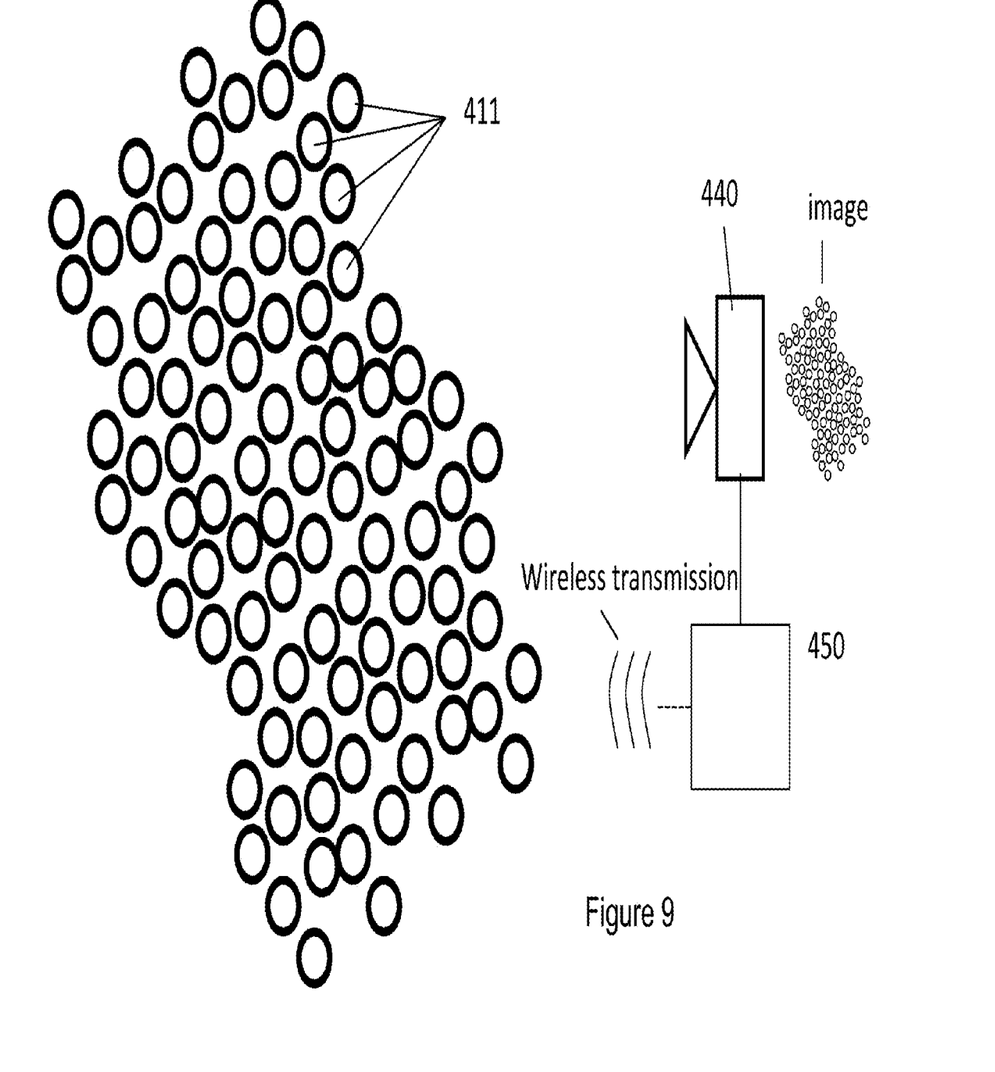
FIG. 9 illustrates an exemplary embodiment of a display system utilizing the light emitting unit of FIG. 8.
Figure 10:
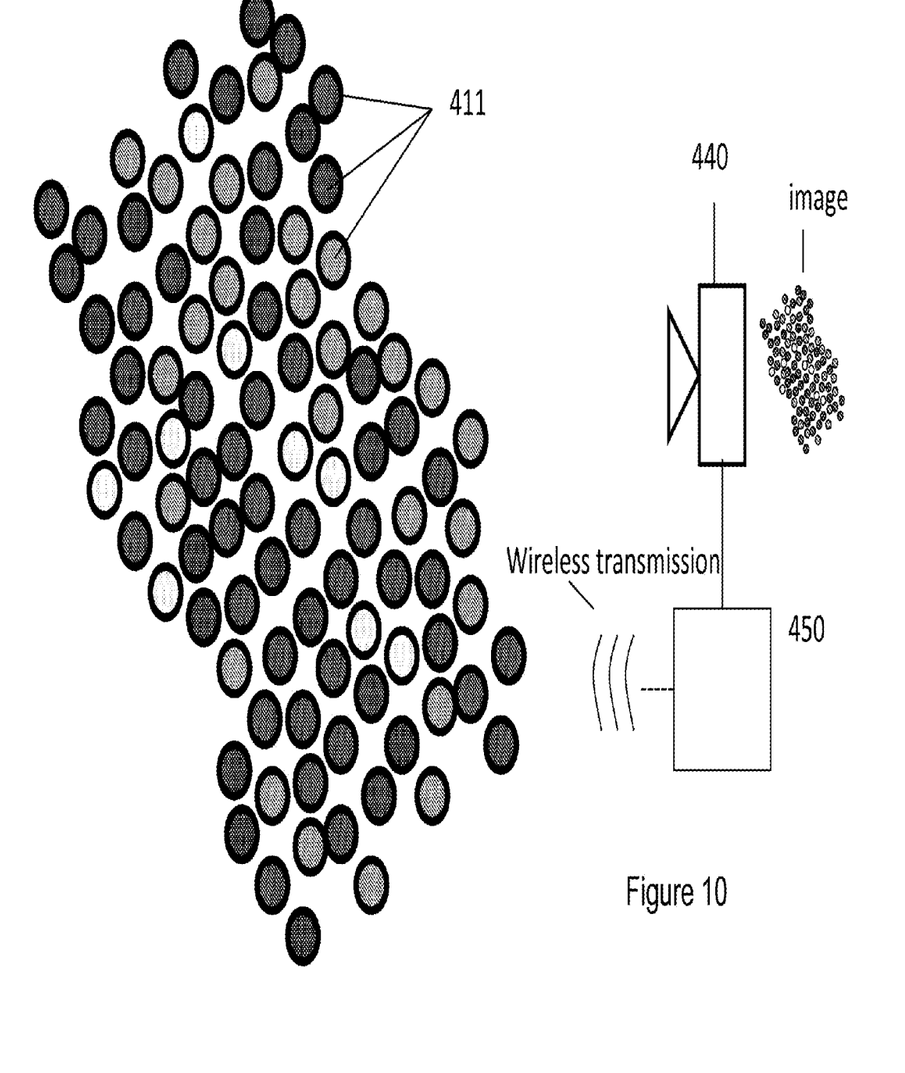
FIG. 10 illustrates another exemplary embodiment of a display system utilizing the light emitting unit of FIG. 8.

FIG. 9 illustrates a spherical light emitting unit 411 that is preferably configured to float in a fluid, such as water. The unit 411 preferably includes a light emitting element 414 configured to selectively emit light and mounted in a hard and translucent shell 411a. The light emitting element 414 may be an LED, for example, however, any suitable light source may be used. A communication element 420 and power element 412 is also preferably mounted in the shell 411a. The communication element 420 is configured to receive instruction information used to control illumination of the light emitting element 414. The units 411 may be grouped together in distinct component groups, if desired, and be provided within a liquid medium, such as water. These groups may include as few as one unit 411 with one communication component 420. The power element 412 may generate and/or store and/or convey power to one of more of the units 411.

Further, energy may be at least in part conducted by or otherwise derived from the liquid or otherwise variable medium in which the component groupings occur via power element 412. This may involve special conductivity properties of the medium and/or other energy conveying operability. Examples include heat within the supporting medium, such as water, providing heat energy to at least a component(s) capable of extracting energy from this heat energy for at least powering the light generating aspect of each component group.

Further, motion of the medium, such as water, may affect at least one unit to generate energy for at least powering the light emitting element 414. This may be a kinetic energy component capable of providing electricity from a conversion of motion, via magnets in some configurations, to power at least one unit 411.

Any such energy generating and/or providing options may include an intermediary step of energy storage, maintained within each unit 411 and/or external to the unit or groups of units. Folio battery configuration options, among other space and shape compatible storage components are examples.

In total, units 411 moving relative to each other within a medium that is variable, such as water or other liquids, are provided herein in certain configurations. Further, these units properly configured and addressed as an aspect of tandem system/method operability, may manifest imaging results that may be of a selectively high level of quality. This quality may related to image stability, color, resolution and/or other aspects known to affect image visibility and result, including both still and motion image sequences.

FIG. 9, for example, illustrates a plurality of units 411 floating in a fluid such as water, An image capture device 440 is positioned to receive light emitted by the light emitting elements 414 thereof. This received light is compared to a desired image, (by a digital data modifying controller unit, for example) either at the image capture device 440 or a separate control element, such as controller 450 of FIG. 9, for example, Based on the comparison of the received light with the desired image, instruction information is generated to control the plurality of units 411 to provide the desired image. The instruction data is preferably transmitted by wireless means to the light emitting units 411. The light emitting element 414 may include multiple LEDs such that brightness and color may be modified to provide the desired image. The fluid in which the units 411 float may be paint or other material that initially allows for movement of the units relative to each other and then dries such that the units are fixed in place.

The image capture device and controller provide instruction information repeatedly at a rate that allows for frequent revisions and adjustments to the moving units 411. This provides a "persistence of vision" phenomenon, that is, revisions take place at about a rate of 24 frames per second or faster. Thus, while the image data being allocated to the units alters "what portion of the image frame is being manifest by what units" to the human eye, the overall image is updated frequently enough that it is seamless and constant appearing. The frequency of updating may be preprogrammed and/or selectable function of the controller 450, for example.

Secondary effects beyond manifesting image(s) for the image capture device to compare to a desired, or ideal, image for providing revised data for transmission to the units, may be imposed. This may include providing at least one instruction for image modification(s) including those related to perspective. For example, an instruction related to a hypothetical position that the image capture device might assume triggers an imposition of algorithmic modifications of digital data transmitted to the units. Such secondary digital modifications, imposed after such controller comparisons between an ideal images) and image(s) manifest by the units emitted light, may provide an acceptable rendition of the desired image to viewer(s) of the display units, whether all or part of the overall array of units, who are positioned differently and thus having a different vantage point of the displayed image(s) than that of the image capture device. Further, the use of multiple image capture device(s) linked to the system, allowing for POV (vantage point) and other modifications of the image(s) manifest by the display and units, selectively as determined by the controller through preprogrammed or update instruction(s) provided via the controller.

In yet another configuration, a double sided configuration may be accomplished with an opaque or predominantly opaque medium. An example may be an expanse that is fabric, or behaves like a fabric. An awning, for example, may be provided wherein light, (or other energy based influence such as heat, wind, vibration or others) influences components on one side of the medium, or awning, and provides power for the reverse side components, which may include light generating units. Thus, a "green" awning is provided, wherein all or part of each awning is coupled with at least a light varying instruction device, preferably a communications device operable to at least receive a signal and apply information within the signal toward a change in light output from at least one LED or other comparable light generating unit component. FIGS. 4-7 illustrate exemplary embodiments of such an awning and the use of one or more awnings on a building or other structure.

Figure 4:
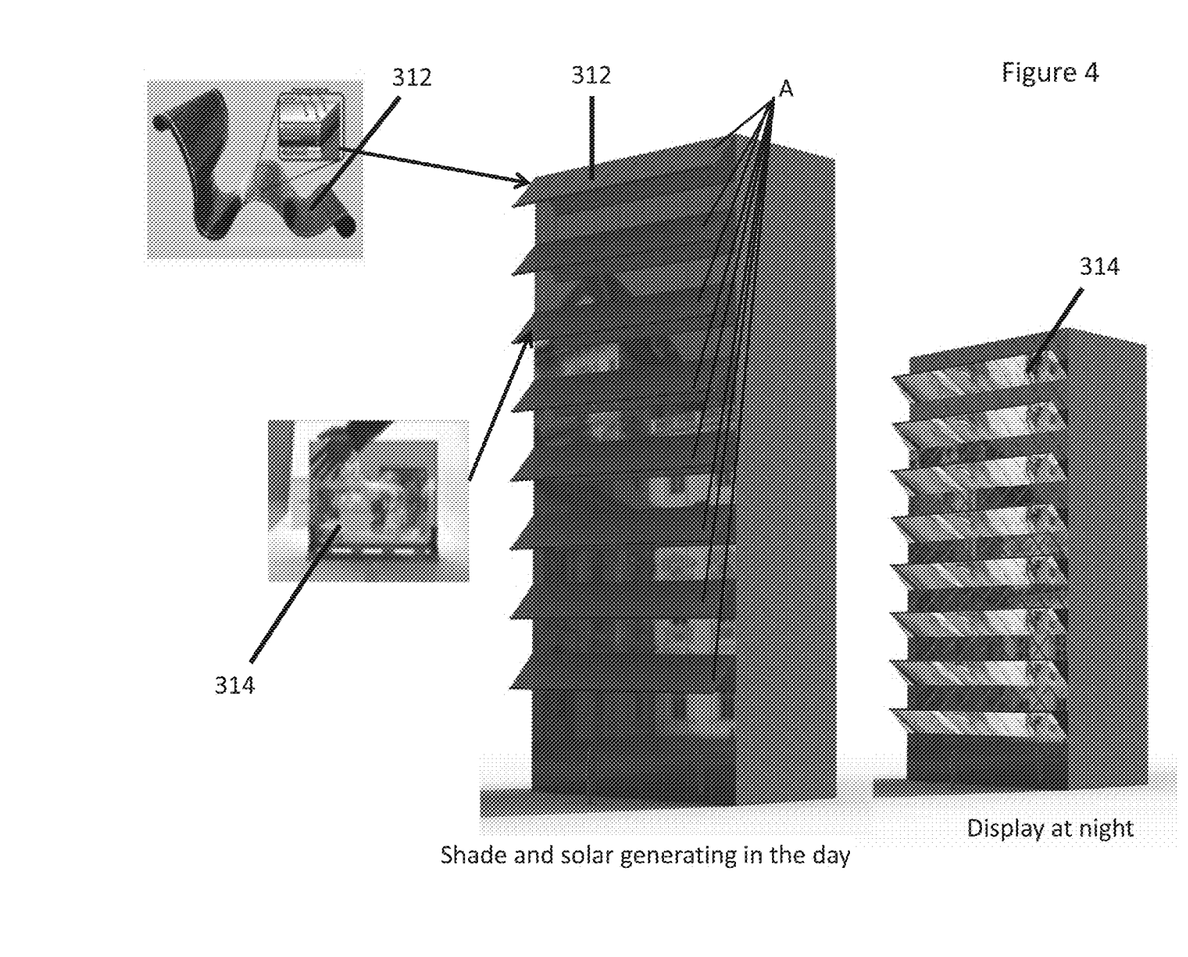
FIG. 4 illustrates an exemplary embodiment of a display system implemented in the form of awnings in accordance with an embodiment of the present disclosure.
Figure 5:
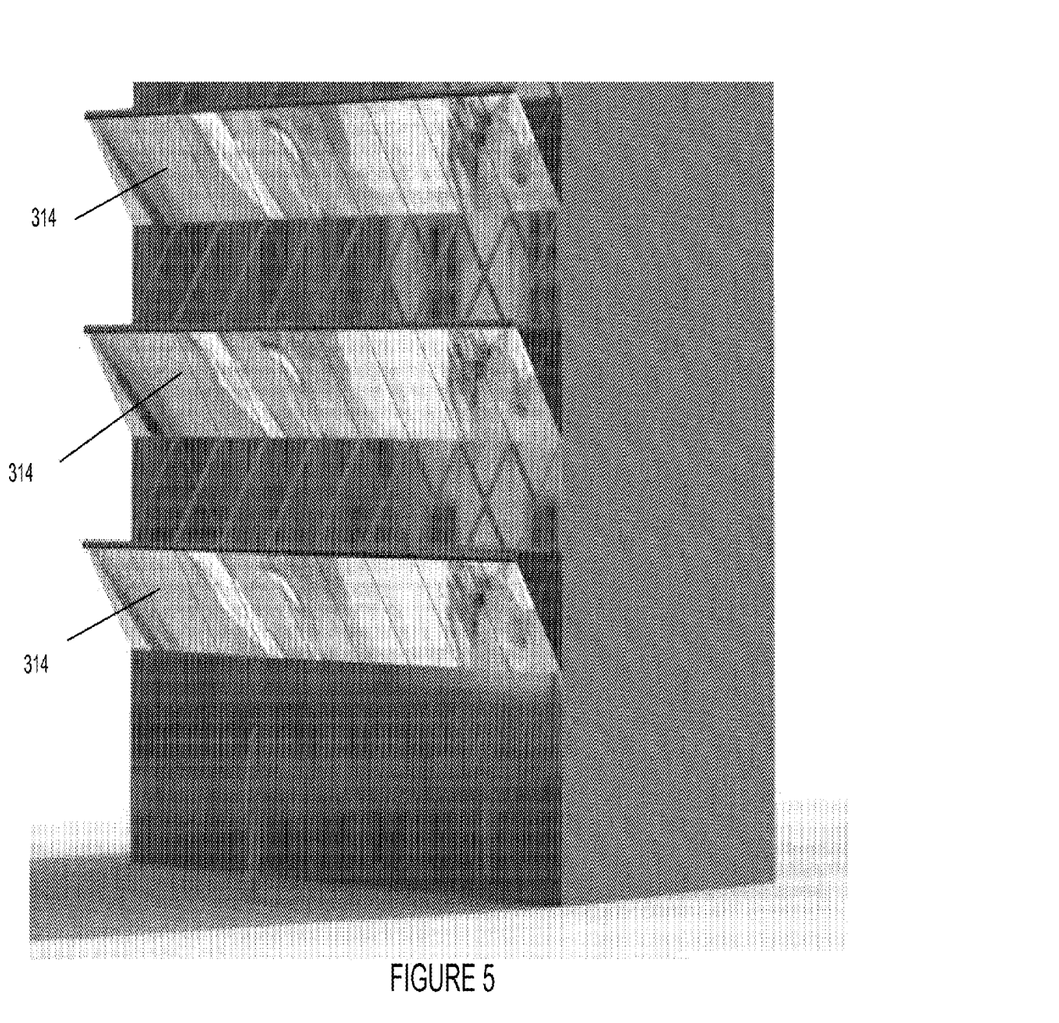
FIG. 5 illustrates another exemplary embodiment of a display system implemented in the form of awnings in accordance with an embodiment of the present disclosure.
Figure 6:
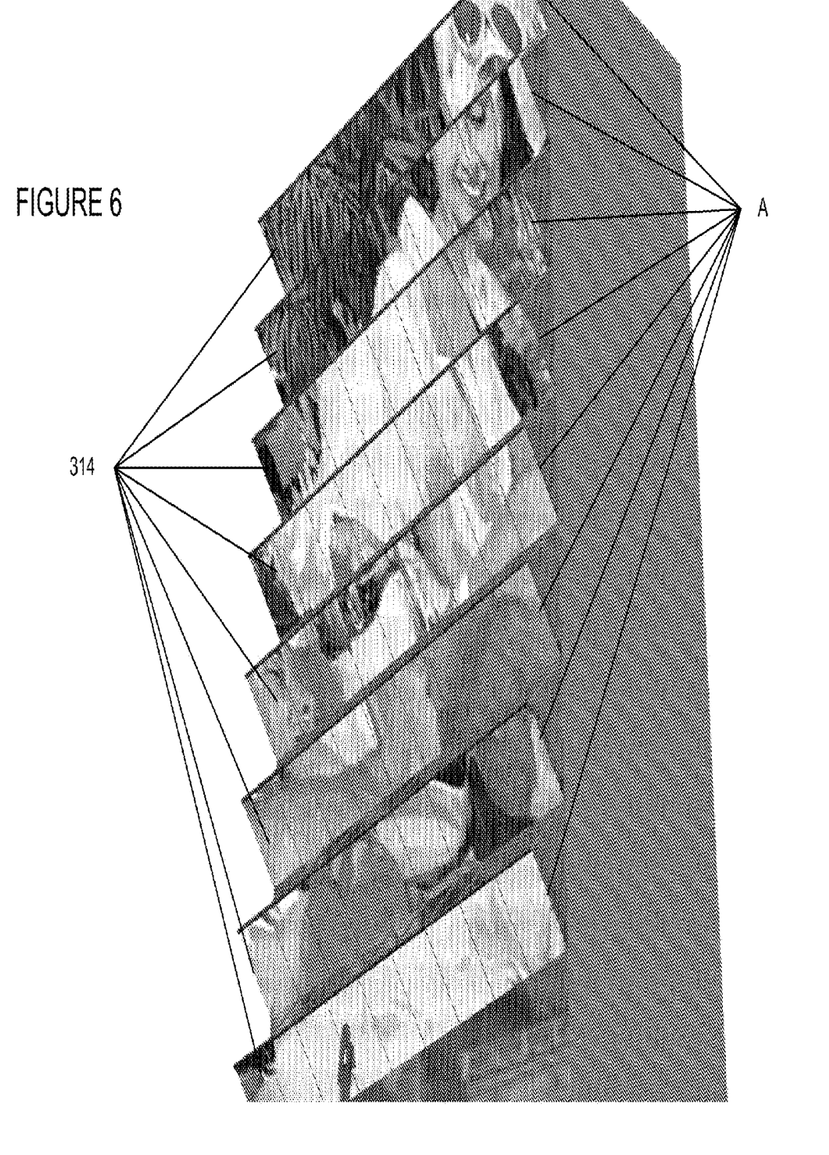
FIG. 6 illustrates another exemplary embodiment of a display system implemented in the form of awnings in accordance with an embodiment of the present disclosure.
Figure 7:
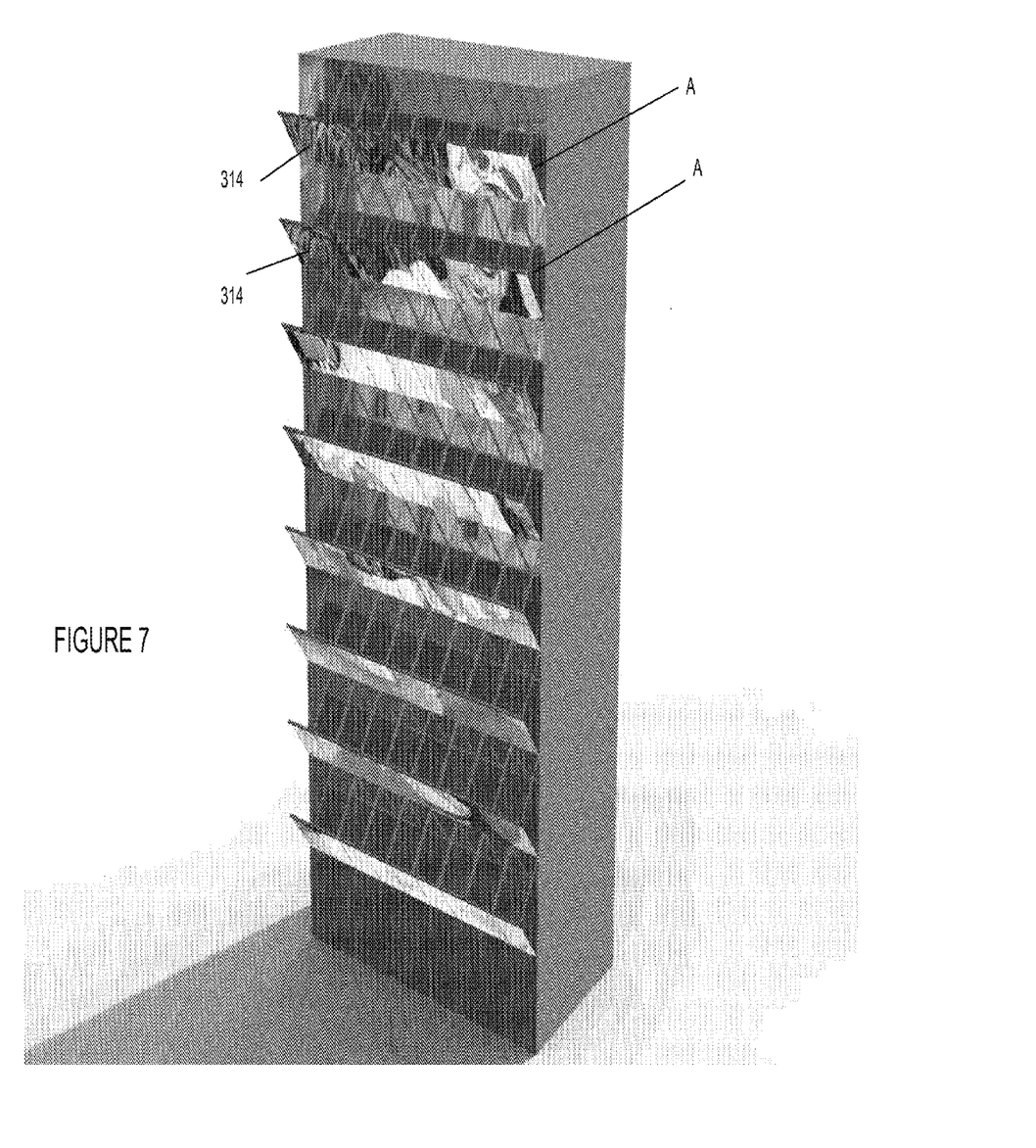
FIG. 7 illustrates another exemplary embodiment of a display system implemented in the form of awnings in accordance with an embodiment of the present disclosure.
Figure 8:
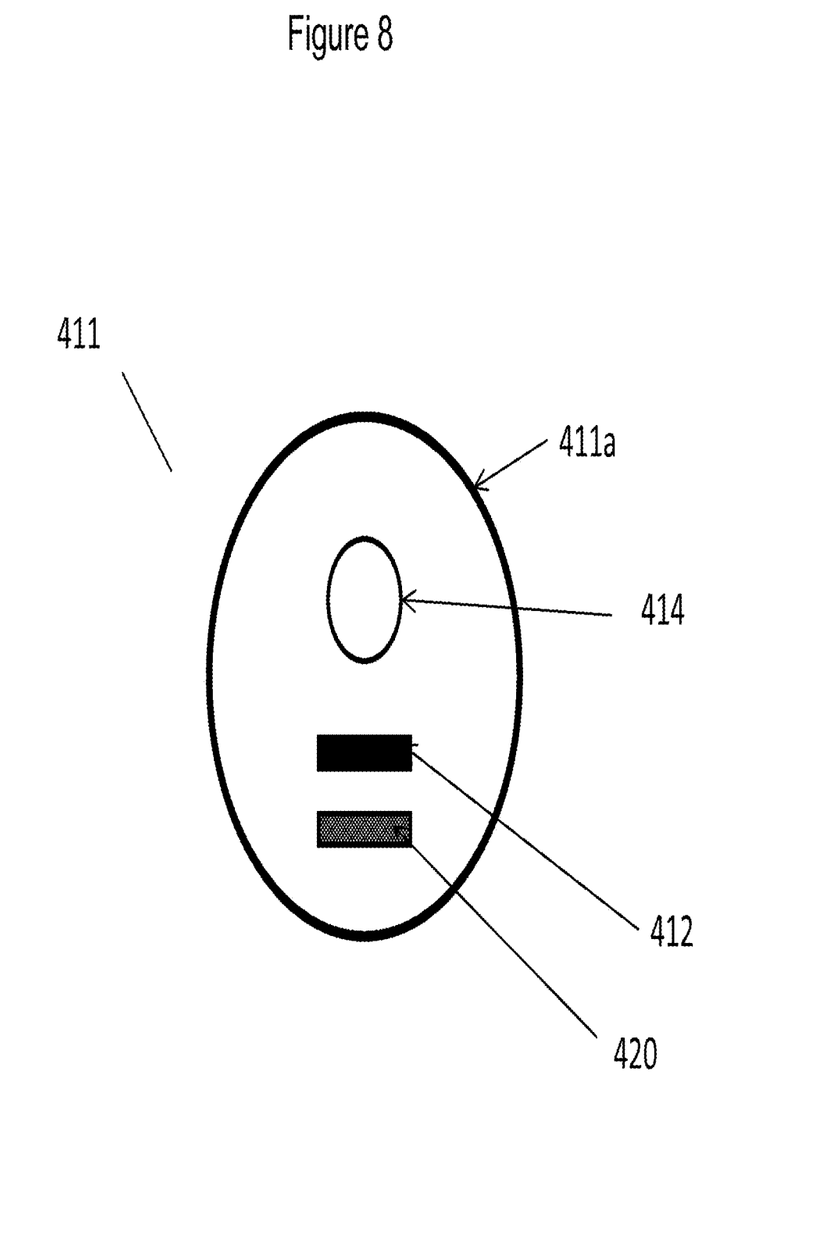
FIG. 8 illustrates an exemplary embodiment of a light emitting unit in accordance with an embodiment of the present disclosure.

More specifically, in FIG. 4 the awning A preferably include a first side 312 that preferably includes a photovoltaic material that may be used to generate electricity. The side of the awning A is preferably positioned on a top of the awning as illustrated in FIGS. 4-7 so that it is exposed to sunlight. The opposite side 314 of the awning A includes at least one light emitting element that is configured to emit light. In a particular embodiment, the light emitting side 314 of the awning A may be an OLED film display that may be powered by the electricity provided by the energy generating material on the first side 312. Any suitable light emitting elements, however, may be used on the light emitting side 312, including a plurality of individually controlled light emitting elements such as the LEDs 14 of FIG. 1.

Preferably, in this configuration, a single communication device is locally coupled with computing operability, relative to a single awning and the light generating devices of the side 314 of a single awning A (or portion thereof) is known with regards to relative position and thus position-addressable from the computing operability. Thus, a plurality of distinct awnings, receiving at least their visual display information wirelessly if not also all or part of their power, may be "synched" based on their position relative to position establishing components of the system. These may or may not include a software application operated by at least one PDA device, (or image capturing PDA device equipped with "Wi-Fi" cellular and/or other communications functionality) or other image capture device which factors actual light output of the LED's of each awning A, in revising information sent to each of the receiving devices, each coupled with at least an aspect of each awning. This visual synching option would further provide a visual reference for aesthetic alterations to options including brightness, color and perspective of at least portions of image(s) manifest by the light generating aspects of the awning(s).

Another configuration may use other position establishing signaling devices, whether GPS based or involving a plurality of positional references. These would establish, preferably via computer managed data, at least the position of awnings (or comparable products) relative to each other, in linking a plurality of such awnings in manifesting a desired image(s) through tandem, wirelessly linked functionality.

In yet another configuration, additional operability is provided to displays involving multiple light generating unit bearing substrates, such as sheaths, stickers and otherwise provided portions of components bearing substrate. Herein, these portions of substrate are not connected physically, but are connected at least in relation to the imaging information apportioned and subsequently manifest by light generating aspects of each substrate portion.

Herein, such portions of substrate preferably feature at least one communication device for at least receiving and preferably receiving and sending information to at least one receiving component associated with at least imaging information. In this configuration, any portion of substrate bearing system components, including light generating units such as LED's, has further functionality to signal via one or more options (including the communications component(s) maintained by the substrate(s) and the light emitting operability of at least one light generating unit) that an issue related to system operability associated with just that portion of substrate exists. Such issues may include light generating unit operability, life and/or functionality details.

Other component issues, including malfunction for example, are also selectively related to component(s) of the substrate including linked functionality to provide a recognizable alert signal, as a transmission preferably. A visually recognizable signal manifest by component(s) of a portion of substrate is another option for providing this system service. The value to this function includes the electronic alerting of system quality control to maintain proper functionality to manifest imaging data on each portion of substrate to the levels of speed, color, brightness and energy management parameters (including battery life) that are deemed thresholds of determined operable necessity by those operating the system components in question.

Thus, the system is self maintaining, even alerting a necessary replacement of a portion of substrate that may be reaching the end of its ability to properly manifest the desired imaging information in concert with other portions of substrate, for example. Thus, the display may be maintained seamlessly, for example, without the necessity for visible malfunction or inactivity of system components, prior to replacement of older or otherwise problematic component groups designated by their respective containment(s), such as portions of said substrate.

Although the present invention has been described in relation to particular embodiments thereof, many other variations and modifications and other uses will become apparent to those skilled in the art.

What is claimed is:

1. A display system comprising:
a plurality of light emitting units configured to float in a fluid medium such that each light emitting unit is movable relative to at least one other light emitting unit;
each light emitting unit further comprising:
a light emitting element configured to selectively emit light;
a communication element operable to receive instruction data to control operation of the light emitting element; and
a power element configured to provide power to at least the light emitting element;
an image capture element configured to receive light emitted by at least one light emitting unit of the plurality of light emitting units comprising less than a desired image and to generate image data based on the light received; and
a controller configured to generate the instruction data based at least on a comparison of the image data to the desired image and transmit the instruction data to the communication element to control the light emitting element such that the display system provides the desired image.

2. The display system of claim 1, wherein the power element is further configured to generate power based at least on the fluid medium.

3. The display system of claim 2, wherein the power element generates power based on absorption of heat from the fluid medium.

4. The display system of claim 2, wherein the power element generates power based on movement of the light emitting unit in the fluid medium.

5. The display system of claim 2, wherein the power element includes a photovoltaic element that generates power based on light.

6. The display system of claim 1, wherein the light emitting element includes multiple light emitting diodes.

7. The display system of claim 6, wherein the multiple light emitting diodes are configured to allow for adjustment of brightness and color of the light emitting element based on the instruction data.

8. The display system of claim 1, wherein the image capture device generated the image information at a predetermined interval such that the instruction data is generated periodically to maintain the desired image.

9. The display system of claim 1, wherein the fluid medium becomes viscous after a period of time such that the light emitting units are fixed in place.

10. The display system of claim 1, wherein the power element includes a power storage element to store power.

11. The display system of claim 1, further comprising a transmitter connected to the controller and configured to transmit at least information related to the instruction data to the communication element.

12. The display system of claim 1, wherein the controller is configured to receive at least an instruction imposing a secondary effect to generate revised instruction data.

13. The display system of claim 12, wherein the instruction relates to the display system displaying the desired image with a revised perspective compared to at least east one hypothetical vantage point different from that of the image capture element, for viewing at least some of the plurality of light emitting units.

14. The display system of claim 1, wherein the power element includes a photovoltaic element.

15. The display system of claim 1, wherein the power element generates power using heat absorbed from the fluid medium.

16. The display system of claim 1, wherein the power element generates power based on the movement of the light emitting units in the fluid medium.

* * * * *